Aug. 21, 1945.   C. E. SORENSEN ET AL   2,383,225
AIRCRAFT MANUFACTURE
Filed Oct. 24, 1942   3 Sheets-Sheet 1

C. E. Sorensen
R. M. Smith   INVENTORS
BY
C. C. McRae and
R. G. Harris
Attorneys Aug. 21, 1945. C. E. SORENSEN ET AL 2,383,225
AIRCRAFT MANUFACTURE
Filed Oct. 24, 1942 3 Sheets-Sheet 2
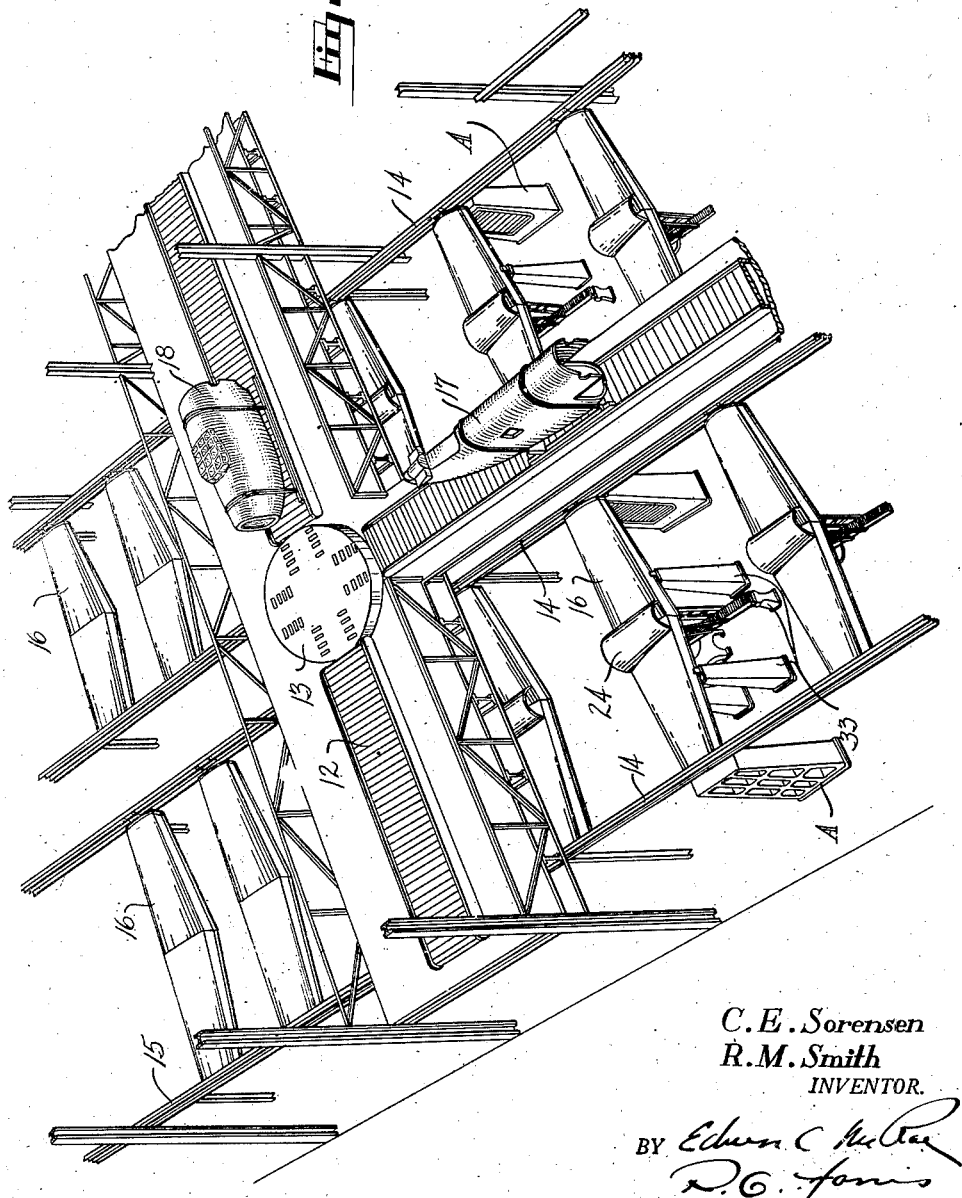
C. E. Sorensen
R. M. Smith
INVENTOR.

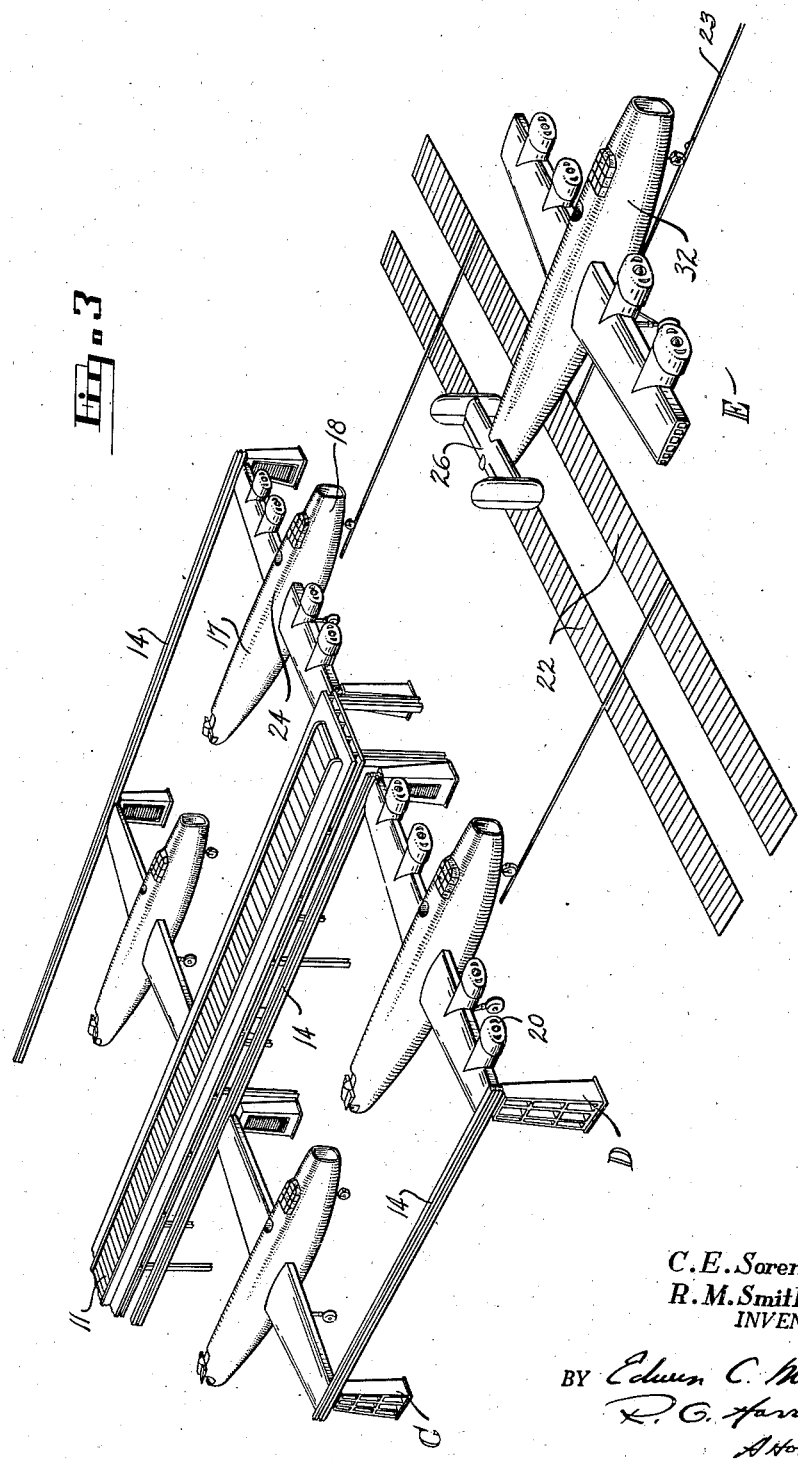

Patented Aug. 21, 1945

2,383,225

UNITED STATES PATENT OFFICE 2,383,225

AIRCRAFT MANUFACTURE

Charles E. Sorensen, Detroit, and Roscoe M. Smith, Ann Arbor, Mich., assignors to Ford Motor Company, Dearborn, Mich., a corporation of Delaware Application October 24, 1942, Serial No. 463,266

2 Claims. (Cl. 29—148)

This invention relates to the art of aircraft construction and, more particularly, to a method and an apparatus for the continuous assembly of aircraft.

While the line assembly method has been used with singular success in the automotive industry and in many other manufacturing operations, it is only recently that attempts have been made to adopt it for use in aircraft. This has been particularly difficult because of the complexity of the assembly procedure and the size of the objects to be assembled. Therefore, when attempts were made to adapt prior conventional methods of line assembly to aircraft construction, it was found that they were far from satisfactory. The only solution appears to be to adopt a new method differing in detail and content from those previously used and directed particularly to the problems encountered in aircraft assembly.

It is therefore an object of this invention to devise an assembly method and apparatus particularly suited to the assembly of even the most complex and largest aircraft. A further object of this invention is to devise an assembly method which may be practiced in the smallest permissible area without impeding the several lines of flow and yet in which adequate provision is made for the prompt and continuous distribution of the various components. Yet another object of the invention is to provide an apparatus particularly suited to the practice of this method. In distinction to the conventional assembly practice, which is basically linear in that it entails the addition of minor component after component to a foundation structure as it progresses, the present method is multidimensional in that it unites a number of linear operations, resulting in major subassemblies which are thereafter mated into major assemblies and which are in turn concentrated from these prior lines for independent rather than cumulative final operations.

With these and other objects in view, this invention consists in the arrangement, construction and combination of the various steps of the improved method, as described in the specification, claimed in the claims, and illustrated in the accompanying drawings, in which:

Fig. 2 is a perspective view of the junction of the major assembly conveyor, distributing conveyor and the wing section conveyors, as viewed from the position 2—2 of Figure 1.

Figure 3 is a perspective view of the end of the wing section conveyor and the transfer conveyor taken from the position indicated by the line 3—3 of Figure 1.

Figure 1:
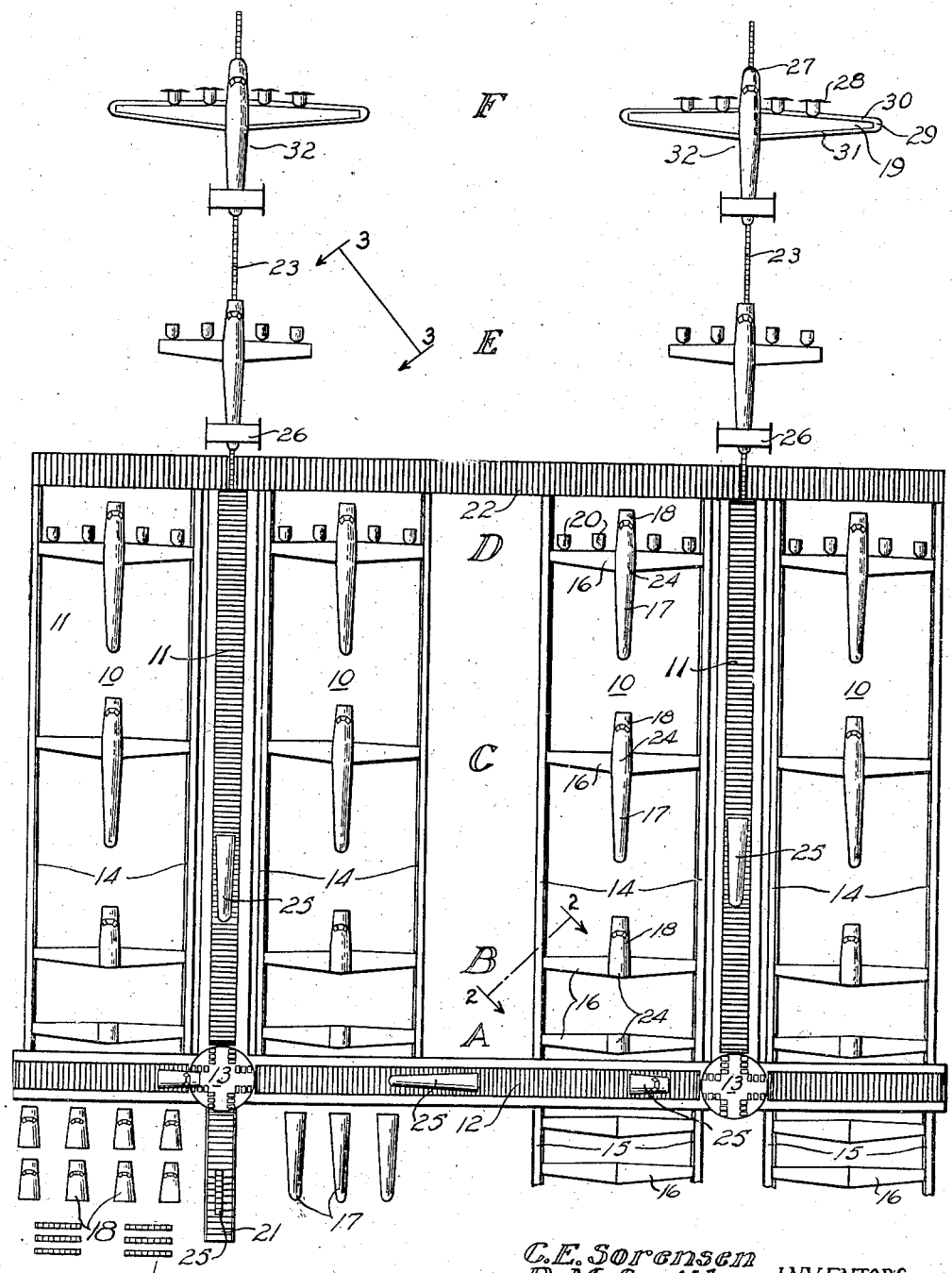
Figure 1 is a diagrammatic view of an assembly plant constructed according to this invention.

Referring now to the drawings, the character 10 indicates the major assembly lines which in this instance are four in number and are constructed in two pairs with a major assembly conveyor 11 intermediate each such pair. These conveyors 11 intersect a distributing conveyor 12 at the turntables 13. Paralleling each of the major assembly conveyors 11 are the two lines of wing section conveyors 14 and these are extended in the right-hand line section, as at 15, as a means of bringing up the center wing sections 16 from their subassembly station. This is shown in detail in Figure 2.

Adjacent to the left major assembly line 11 and behind the distributing conveyor 12 are maintained stocks of other principal subassembly components, such as the rear fuselage section 17, the nose fuselage section 18 and the outer wing section 19. A primary conveyor 21 serves this stock and facilitates its transport and delivery to the distributing conveyor 12. Preferably, the conveyors 11 and 12 are located above the floor elevation of the plant to permit the transfer of the components from them to the respective major assembly stations. Underneath the distributing conveyor 12 is a similar floor level distributing conveyor not shown which serves to transport the center wing sections 16 from the right side lines 15 to the wing section conveyors 14 of the major assembly line 10 on the left.

At the upper end of the major assembly line is a transverse transfer conveyor 22 substantially at floor level running across at least each pair of major assembly lines, and which may be extended across all four, by means of which the completed major assemblies may be removed from these lines and transferred to the final assembly conveyor 23, after which the planes progress linearly until the assembly operations are completed as shown in Figure 3. The wing section conveyors engage the ends of the wing sections and move them and the other components as they are added to it mediate the floor level and the assembly conveyors 11.

It is believed the drawings make clear the method of assembly in that the center wing sections 16 are utilized as the basis for the major assembly itself. These are fabricated at primary wing subassembly stations and are brought from them on the extension conveyor 15 directly to the wing section conveyors 14 of the right bank and by the lower distributing conveyor to those of the left bank by means of which they are independently transported through all of the major assembly stations.

The other major subassembly components have likewise been fabricated previously at their respective subassembly stations and these, which include the bomb bay, fuselage nose section, fuselage aft section, and outer wing sections, progress by conveying mechanisms not shown from these fabricating subassembly stations to the position shown in the lower part of the drawings preliminary to the major assembly steps.

It will thus be noted that there are four major assembly lines and that the same operations are being performed on different aircraft at coordinate stations on each of them simultaneously. Thus, the wing sections 16 are first placed on several wing section conveyors 14 and at station A in each line the bomb bay and top center fuselage section 24 is attached to the wing. Thereafter, the wings progress independently to station B, at which the nose fuselage section 18 is mated with the wing and its structure. This progresses to station C, at which the aft fuselage section is added. It will be understood that these subassembly components are being continuously transported on the distributing and major assembly conveyors, as indicated at 25, to the various major assembly stations.

Thereafter, the assembled fuselage and center wing section move to station D, at which the engines and associated cowling 20 and the usual landing gear are added. This completes the assembly of the major portions and the plane is then released from the wing section conveyors 14 and rests upon the landing gear and is thus deposited on the transverse conveyor 22 by means of which it is transported to one of the final assembly conveyors 23. It will be understood that the planes are taken from the major assembly lines alternately or as they reach completion thereon and transferred to the final assembly line 23.

On the final assembly line, the tail empennage 26 is added at station E and the other parts, such as the nose 27, propellers 28, outer wing sections 19, wing tips 29, leading edges 30, trailing edge assembly 31, are added at subsequent stations which are not detailed. After this, the completed plane 32 is ready to be submitted to the usual tests. It will be understood, of course, that throughout the assembly steps from station A onwards, the necessary internal connections between the electrical, radio, hydraulic, cable, and other circuits are being made and these progress along with the major assembly steps. Further, the minor equipment and furnishings which are not conveniently installed on the components prior to major assembly are placed.

One of the principal advantages of this method is the economy of manufacturing space which is attained by interleaving the planes from at least two major assembly lines to a single final assembly line which permits a concentration of working space. Another result is that the planes can be automatically spaced throughout the major assembly line to require precisely the amount of room necessary and are not held to a fixed distance, as would be necessary if a continuous spaced line were used. Still another advantage is that, depending upon the progress of work, the major assembly can be shifted to either of the final conveyor lines if that be desired and, in the event that there is a delay in one of the lines, it may be made good from the other. In the present instance, as shown in detail in Figures 2 and 3, the work is brought to a full stop at each of stations A, B, C, and D; is engaged in suitable mating fixtures 33 which correlate the assembly with the component to be added at that station; and the particular assembly is completed before the work is moved to the next station.

While only the major subassembly components, such as the center wing sections, the outer wing sections, the engines, the fore and aft fuselage sections, etc., are shown, it will be evident that provision is also afforded for distribution of such minor portions as the wing tips, leading edges, propellers, noses, tail empennages and all of the other components that go to make the finished plane. While a definite number of stations have been shown and certain operations performed at each, it will be understood that this depends upon the division of the individual type plane into its components and it might be varied and increased or diminished as the complexity of the particular structure required.

While the use of wing section conveyors is particularly advantageous in the assembly of high wing planes such as are shown here in that sufficient clearance is afforded between the wing and the mating fixtures, it may be used as well with medium or low wing craft. It has the further advantage that any stresses encountered in the assembly are of the same nature as will be impressed upon the plane in flight. No other suspension method achieves this. Similarly, while it is here shown is applied to the assembly of planes having wing spreads of upwards of 100 feet. But it likewise permits the use of factories having conventional aisle widths for assembly operations with a minimum of structural change.

Some changes may be made in the arrangement, construction and combination of the various parts of the improved device without departing from the spirit of the invention, and it is the intention to cover by the claims such changes as may reasonably be included in the scope thereof.

The invention claimed is:

1. The method of fabricating aircraft having large wing spread from a plurality of initially fabricated major subassembly components thereof, one of said major subassembly components comprising a wing unit subassembly composed of centrally joined wing sections, and certain other of said components comprising fuselage subassemblies, said method comprising, solely supporting said wing unit by the tips of said wings, leaving the remaining portions of the unit unsupported, and while said wing unit is so supported, assembling said fuselage sections with the central portion of said wing unit, and thereafter assembling other major subassembly components thereof.

2. The method of fabricating aircraft having large wing spread from a plurality of initially fabricated major subassembly components thereof, one of said major subassembly components comprising a wing unit subassembly composed of two centrally joined wing sections, and certain other of said components comprising fuselage subassemblies, said method comprising, solely supporting said wing unit at points adjacent the outer end of each of said wing sections, leaving the remainder of the unit unsupported, and while said wing unit is so supported, assembling said fuselage sections with the central portion of said wing unit, and thereafter assembling thereto other major subassembly components thereof.

CHARLES E. SORENSEN.
ROSCOE M. SMITH.